(12) United States Patent
Barron et al.

(10) Patent No.: US 8,262,785 B2
(45) Date of Patent: *Sep. 11, 2012

(54) HYDROCARBON ADSORPTION TRAP FOR AN ENGINE AIR INTAKE TRACT

(75) Inventors: Joshua Barron, Kalamazoo, MI (US); Beau Kidman, Kalamazoo, MI (US)

(73) Assignee: Mann & Hummel GmbH, Ludwigsburg (DE)

(*) Notice: Subject to any disclaimer, the term of this patent is extended or adjusted under 35 U.S.C. 154(b) by 526 days.

This patent is subject to a terminal disclaimer.

(21) Appl. No.: 12/512,389

(22) Filed: Jul. 30, 2009

(65) Prior Publication Data

US 2011/0023719 A1 Feb. 3, 2011

(51) Int. Cl.
*B01D 53/02* (2006.01)

(52) U.S. Cl. .............. 96/134; 96/144; 96/154; 95/146; 55/385.3; 123/519

(58) Field of Classification Search ............ 55/385.3, 55/487; 96/130, 131, 144, 153, 147; 95/146; 422/173; 123/516, 519

See application file for complete search history.

(56) References Cited

U.S. PATENT DOCUMENTS

| | | | |
|---|---|---|---|
| 3,686,837 A * | 8/1972 | Hopkins et al. ............. 55/487 |
| 5,158,753 A * | 10/1992 | Take et al. .................. 422/173 |
| 5,914,294 A | 6/1999 | Park et al. |
| 5,914,457 A * | 6/1999 | Itakura et al. .............. 96/130 |
| 7,094,268 B2 * | 8/2006 | Krantz ........................ 55/385.3 |
| 7,311,088 B1 | 12/2007 | Callahan et al. |
| 7,458,366 B2 | 12/2008 | Luley et al. |
| 7,531,029 B2 * | 5/2009 | Hoke et al. ................. 96/134 |
| 7,578,285 B2 * | 8/2009 | Buelow et al. .............. 123/516 |
| 8,025,132 B2 * | 9/2011 | Krantz ........................ 188/218 A |
| 2004/0226440 A1 * | 11/2004 | Foong et al. ................ 95/146 |
| 2005/0223894 A1 | 10/2005 | Sohnemann |
| 2006/0185651 A1 | 8/2006 | Hagler |
| 2008/0053050 A1 | 3/2008 | Arruda et al. |
| 2011/0072974 A1 * | 3/2011 | Patel .......................... 96/147 |
| 2011/0100223 A1 * | 5/2011 | Tarrant et al. .............. 96/147 |

* cited by examiner

*Primary Examiner* — Duane Smith
*Assistant Examiner* — Minh-Chau Pham
(74) *Attorney, Agent, or Firm* — James Hasselbeck

(57) ABSTRACT

A hydrocarbon adsorption trap for adsorption of evaporated fuel vapors includes a first fuel vapor permeable media retention layer, a second media retention layer positioned in a spaced parallel relationship to the first layer forming a gap therebetween and a hydrocarbon vapor adsorbent media disposed in the gap between the first and second layers for adsorbing evaporated fuel vapors from the intake tract when the engine is not operating. A mounting member is secured to peripheral edge portions of the layers and closes the gap between the layers while providing a means of securing the trap into an air intake tract.

14 Claims, 2 Drawing Sheets

HYDROCARBON ADSORPTION TRAP FOR AN ENGINE AIR INTAKE TRACT

TECHNICAL FIELD

The invention relates to air cleaners and air intake systems for internal combustion engines and, more particularly, to devices for trapping hydrocarbon vapors such as fuel vapors in the air intake system when the engine is shut down and then releasing the trapped vapor back into the air intake system when the engine is later operated.

BACKGROUND OF THE INVENTION

It is desirable to trap evaporated fuel and oil vapors within the air intake system, thereby preventing their release into the outside environment. Fuel vapors contain hydrocarbons which are known to be a significant contributing component in urban smog.

Gasoline, for example, is a highly volatile hydrocarbon fuel that includes components which transition easily from a liquid to vapor phase. Elevated temperatures such as occurring during normal internal combustion engine operation accelerate the liquid to vapor transition. The hydrocarbon vapors, unless treated or captured, may ultimately discharge into the atmosphere. It is known that hydrocarbon vapors are discharged from the engine crankcase during engine operation. When the engine is shutdown, these vapors may continue to be released from the hot engine crankcase and other components, particularly as the engine cools.

The control of hydrocarbon vapors escaping into the environment is regulated by state and federal regulations. Hydrocarbon traps for capturing hydrocarbon vapors are well known. For example, motor vehicles are commonly equipped with hydrocarbon adsorptive emissions canisters connected to the fuel tank for trapping hydrocarbon vapors, particularly as emitted during refueling.

It is known that certain porous materials such as activated carbon are useful for absorption and removal of organic hydrocarbon vapors. It is known hydrocarbon vapors are liquefied within small micro pores of the activated carbon and may be retained by absorption.

Various types of hydrocarbon traps for capturing hydrocarbon vapors are known in the art. For example, U.S. Pat. No. 5,914,294 discloses a monolithic trap which adsorbs chemical constituents from a gas stream. This is achieved by bringing the gas into direct contact with the activated carbon in the monolith. One disadvantage of this type of extruded or press formed hydrocarbon trap is that the extrusion and binding process results in a relatively brittle trap that may crack or have individual pieces flake off.

Another example is U.S. Published Application 2005/0223894 which discloses an adsorption element for adsorbing gases and vapors from the intake tract of an engine. The adsorption element has free-flow channels in an element having a spacer layer and an adsorption layer. One disadvantage of this type of corrugated trap is that the trap itself introduces a restriction to airflow in the intake tract.

Therefore, there remains a need in the art for a hydrocarbon adsorption trap that is rugged, low in cost, and does not present a restriction to air flow in the air intake tract.

SUMMARY OF THE INVENTION

In various aspects of the invention a hydrocarbon adsorption trap (HCA trap) for adsorption of evaporated fuel vapors within an air intake tract of an internal combustion engine includes a first fuel vapor permeable media retention layer, a second media retention layer positioned in a spaced parallel relationship to the first layer forming a gap therebetween and a hydrocarbon vapor adsorbent media disposed in the gap between the first and second layers for adsorbing evaporated fuel vapors from the intake tract when the engine is not operating. The HCA trap further includes a mounting member secured to peripheral edge portions of the first and second layer and projecting outwards therefrom. The mounting member seals the gap at the layer edge portions to retain the adsorbent media between the layers. The mounting member is configured and adapted for mounting the adsorption trap within the air intake tract.

In another aspect of the invention the mounting member of the hydrocarbon adsorption trap is realized with a material selected from the group consisting of plastisol, polyurethane or polyester blend.

In another aspect of the invention the trap layers are provided with at least one hole or cut-out extending therethrough. The hydrocarbon vapor adsorbent media is in a granular form. An annular barrier is provided circumscribing each of the holes in the layers and adapted to seal the granules within the trap, preventing their outwards leakage through the holes.

In another aspect of the invention hydrocarbon adsorbent media includes activated carbon granules.

In another aspect of the invention hydrocarbon adsorbent granules are bound together by an adhesive, the adhesive maintaining the granules in a desired spaced distribution between the layers and optionally in a preferred shape or form (such as a sheet form).

In another aspect of the invention the mounting member circumferentially extends about, secures and closes all of the edge portions of the hydrocarbon media containment layers.

In another aspect of the invention the mounting member includes at least one through-hole for securing the trap in the air intake tract.

In another aspect of the invention the hydrocarbon absorbent containment layers comprise polyester fibers.

In another aspect of the invention the mounting member is secured to the layers by any of: injection molding, vibration welding or heat welding.

In another aspect of the invention all of the hydrocarbon absorbent media containment layers are hydrocarbon vapor permeable.

In another aspect of the invention the hydrocarbon adsorption trap further includes at least one supplemental media retention layer disposed between and in a spaced parallel relationship to the first and second layers. The supplemental media retention layer or layers divide the gap into sub gaps. Hydrocarbon vapor adsorbent media is disposed in the sub gaps.

In another aspect of the invention the adsorption trap is secured within an air cleaner housing.

In another aspect of the invention an air cleaner housing is provided having an air inlet port, an air outlet port and defining a chamber therein. A filter element is disposed in the chamber and configured to filter air flowing between the inlet and outlet ports. A hydrocarbon adsorption trap is permanently secured to an interior wall of the air cleaner housing. The hydrocarbon adsorption element includes a first fuel vapor permeable media retention layer, a second media retention layer positioned in a spaced parallel relationship to the first layer forming a gap therebetween and a hydrocarbon vapor adsorbent media disposed in the gap between the first and second layers for adsorbing evaporated fuel vapors from the intake tract when the engine is not operating. The HCA trap further includes a mounting member secured to peripheral edge portions of the first and second layer and projecting outwards therefrom. The mounting member closes the gap at the layer edge portions and operatively retains the adsorbent media between the layers. The mounting member is configured and adapted for securing the hydrocarbon adsorption trap within the air cleaner.

The above features and advantages and other features and advantages of the present invention are readily apparent from the following detailed description of the best modes for carrying out the invention when taken in connection with the accompanying drawings.

BRIEF DESCRIPTION OF THE DRAWINGS

The accompanying Figures where like reference numerals refer to identical or functionally similar elements throughout the separate views and which together with the detailed description below are incorporated in and form part of the specification, serve to further illustrate various embodiments and to explain various principles and advantages all in accordance with the present invention.

Features of the present invention, which are believed to be novel, are set forth in the drawings and more particularly in the appended claims. The invention, together with the further objects and advantages thereof, may be best understood with reference to the following description, taken in conjunction with the accompanying drawings. The drawings show a form of the invention that is presently preferred; however, the invention is not limited to the precise arrangement shown in the drawings.

Figure 1:
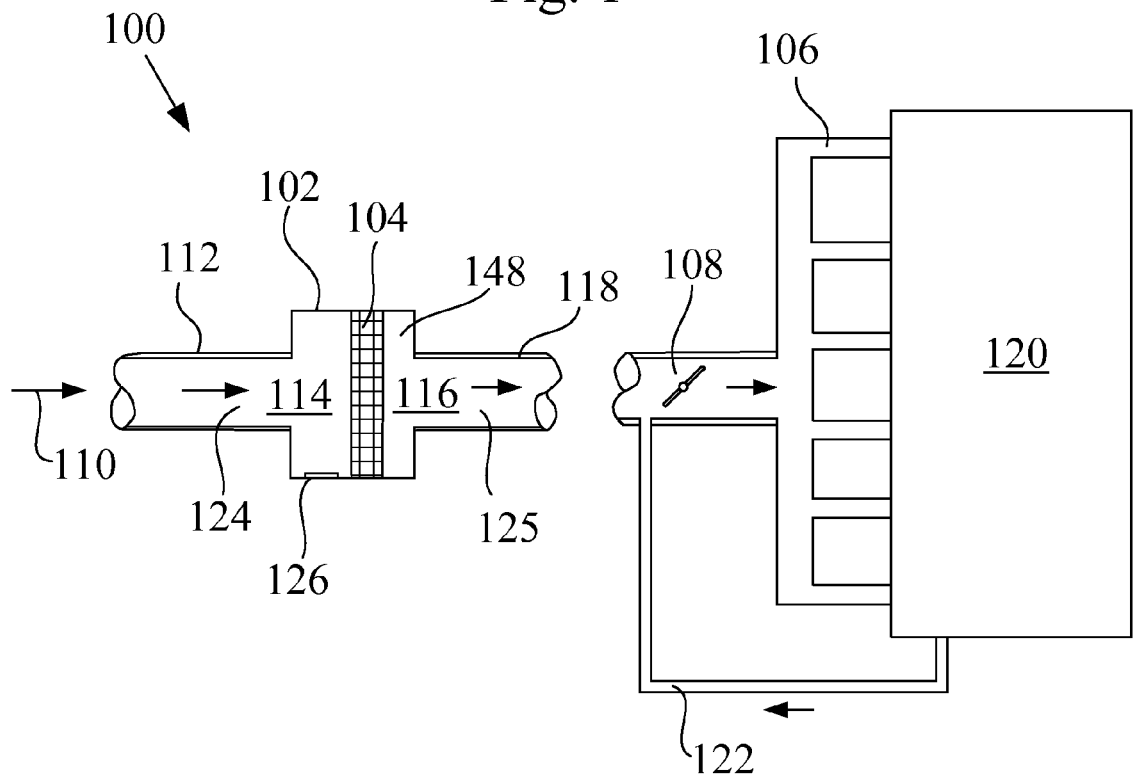
FIG. 1 is a schematic diagram of an air intake tract for an internal combustion engine equipped with a hydrocarbon trap, consistent with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of apparatus components related to a hydrocarbon adsorption trap for an engine air intake tract as disclosed herein. Accordingly, the apparatus components may have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

FIG. 1 is a schematic diagram of an air intake tract for an internal combustion engine equipped with a hydrocarbon trap, consistent with the present invention. The air cleaner 102 housing defines a chamber 148 therein. An air filter element 104 is received into the chamber 148 and divides the chamber 148 into a dirty side 114 and a clean side 116. A vacuum induced by the operation of the internal combustion engine 120 acts to draw outside air stream into the intake tract 100 through intake tract portion 112. The air stream enters the inlet port 124 of the air cleaner 102 to be received at the dirty side 114 of the air cleaner. The air stream flows through the filter element 104 to the clean side 116 of the air cleaner 102. The filter element 104 is adapted and configured to block the passage of particulates that may be present in the outside air stream. The now relatively clean intake air stream exits the outlet port 125 to be drawn along intake tract portion 118, perhaps passing through throttle body 108 (if present) and then entering the intake manifold 106 of internal combustion engine 120. FIG. 1 also depicts an optional crankcase vent line 122. For environmental reasons and to meet regulatory requirements, oil and fuel vapors from the crankcase of engine 120 may be vented back into the intake tract 100 such as through crankcase vent line 122, or other similar means, so as to be burned in the combustion cycle of the engine 120, thereby preventing the direct release of fuel and oil vapors (hydrocarbon vapors) into the environment.

When the internal combustion engine 120 shuts down after operation, volatilized hydrocarbon vapors may be present in the intake tract 100 and may continue venting from the crankcase through vent line 122, however these hydrocarbon vapors are no longer drawn into the intake manifold 106 to be burned, therefore hydrocarbon vapors may instead find their way along the intake tract portion 118 to eventually reach the air cleaner 102 and potentially discharge into the outside environment.

According to the present invention, a hydrocarbon absorptive trap 126 (or HCA trap) is provided, positioned within and secured to an interior portion of the air cleaner 102 at either the clean side 116 or the dirty side 114. When the engine 120 is shutdown, hydrocarbon vapors may flow backwards through the air intake tract 100 to eventually reach the air cleaner 102. HCA trap 126 is operative to adsorb hydrocarbon vapors before they can reach the outside environment. The HCA trap 126 comprises an absorptive media such as activated carbon, zeolite, or other hydrocarbon vapor absorptive materials disposed between vapor permeable layers. Activated carbon is a preferred hydrocarbon adsorptive media as it is inexpensive, environmentally friendly and readily available.

As the HCA trap is operative to trap hydrocarbon vapors when the engine is shutdown and then later release the trapped vapors when the engine restarts, the HCA trap 126 has a relatively long life and therefore does not normally need to be replaced. In embodiments presented herein, it is preferred that the HCA trap 126 be permanently secured within the air cleaner 102 and positioned in the vicinity of but not obstructing the intake air flow through the air cleaner 102. Preferably the HCA trap 126 is permanently secured to an interior wall of the air cleaner 102, although the trap may instead be secured at any suitable location along the intake tract 100. By securing the HCA trap 126 to a sidewall of the air cleaner 102 or air intake tract 100, intake air flow may tangentially contact but is not required to pass through the HCA trap 126. This is advantageous as the HCA trap 126 positioned to the side of the air stream does not introduce an obstruction or restriction to air flow in the air intake tract 100.

As discussed above, when the engine 120 shuts down, hydrocarbon vapors within the air intake tract portion 118, such as present in the intake manifold 106 or rising from the crankcase through vent line 122, may migrate backwards up the air intake tract portion 118 towards the air cleaner 102. The movement or flow rate of these hydrocarbon vapors is quite slow, permitting the HCA trap 126 to be positioned off to the side of the air flow and to be exposed only tangentially to the migrating hydrocarbon vapor. The HCA trap 126 so positioned is operative to absorb these back flow hydrocarbon vapors due to the minimal flow rate and therefore the relatively long exposure time of the hydrocarbon vapors to the HCA trap 126.

When the engine 120 later restarts, then outside air entering the air cleaner 102 is brought into contact with the HCA trap 126 and causes the trapped hydrocarbon vapors to be released from the HCA trap 126 back into the intake tract 100 where they are available to be burned with the intake air stream delivered to the engine 120.

Figure 2A:
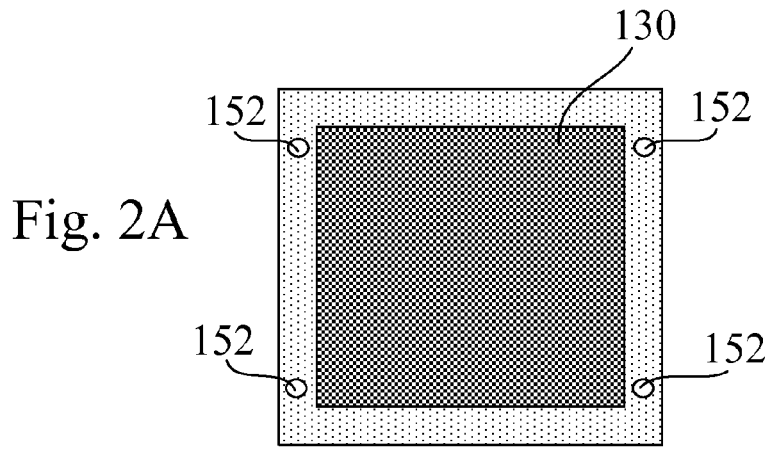
FIG. 2A is a schematic plan view of one embodiment of a hydrocarbon absorption trap (HCA trap), consistent with the present invention.
Figure 2B:
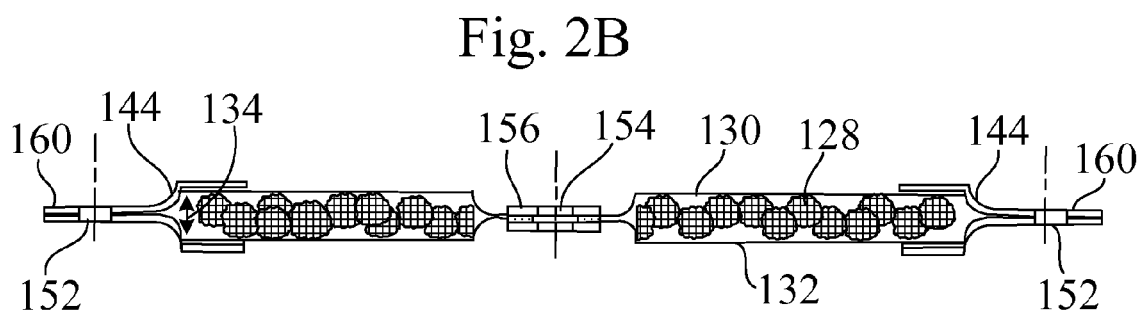
FIG. 2B is a sectional side view of a hydrocarbon absorption trap (HCA trap) illustrating general features of the invention and further depicting optional cutouts and through holes with annular barriers as present in some portion of, but not all, embodiments of the invention.

FIG. 2A is a schematic plan view of one embodiment of a hydrocarbon absorption trap (HCA trap) 126, consistent with the present invention. FIG. 2B is a sectional side view of an embodiment of the hydrocarbon absorption trap also depicting cut-out(s) 154 and annular barrier(s) 156 as provided in some, but not all, embodiments of the invention. FIGS. 2A and 2B depict a generally rectangular and generally planar HCA trap, however it is to be understood that the illustrated shape was presented merely for presentation/discussion purposes and that the HCA trap may have any suitable shape as desired or required for mounting into an air cleaner or into the air intake tract. In FIG. 2B a hydrocarbon vapor absorptive media 128 is disposed and contained between a first hydrocarbon vapor permeable layer 130 and a second layer 132 positioned in a spaced parallel relationship to the first layer 130. As the HCA trap may be installed with the second layer 132 facing or contacting a wall of the air intake tract or air cleaner, the second layer is not required in all envisioned embodiments to be hydrocarbon vapor permeable although it is preferable that it is. The hydrocarbon vapor absorptive media 128 is disposed (preferably evenly distributed) in the gap 134 between the layers 130 and 132 and configured for absorbing hydrocarbon vapors from the intake tract 100, particularly when the engine 120 is not operating. The hydrocarbon vapor permeable layer 130 and optionally the second layer 132 may be realized as woven or non-woven synthetic fiber layers, for example polyester fiber layers. In some embodiments the layers 130 and/or 132 may be realized as synthetic fiber sheets.

In FIG. 2B a synthetic fiber mounting member 144 is provided and secured to peripheral edge portions of the first 130 and second 132 layers, closing out the gap 134 between the layers 130 and 132 thereby insuring retention of the hydrocarbon vapor absorptive media 128 within the gap 134 between the layers 130 and 132. The mounting member projects generally outwards from the layers 130, 132 to provide a means to mount or secure the HCA trap within the air intake tract 100. Through holes 152 may be provided extending through the mounting lip 160 of the mounting member 144, preferably positioned at opposing sides of the HCA trap 126. Screws, heat stakes or other mounting means may be received through the through holes 152 for securing the HCA trap 126 into the air cleaner 102 or air intake tract 100.

In preferred aspects of the invention, the HCA trap 126 is secured within either the clean 116 or dirty 114 side of the air cleaner 102. In other aspects of the invention, the HCA trap 126 may secured at any appropriate location within and along the intake tract 100.

In various aspects of the invention the mounting member may be realized using materials such as non-woven polyester fleece, molded polyurethane or plastisol. Preferably the mounting member is secured to the layers 130 and 132 without the use of an adhesive. When a polyester synthetic fiber material is utilized to form the mounting member, the mounting member may be secured by ultrasonic welding or alternately hot iron welding onto the periphery of the layers 130, 132 (similar to the illustration of FIG. 2B).

Plastisol is a heat cured material adaptable to relatively simple slush molding or casting. As an alternate to polyester fibers, plastisol may be used to wet cast and secure the mounting member directly onto the peripheral portions of the layers 130 and 132. It is known that plastisol tends not to saturate or soak through the fibers of the synthetic hydrocarbon vapor permeable layers 130 and 132 and so advantageously does not migrate significantly into or occlude interior portions of the hydrocarbon vapor permeable layers 130 and 132. Alternately, polyurethane may be molded directly onto peripheral portions of the layers 130 and 132 thereby securing the polyurethane mounting member to the layers without the use of an adhesive.

Figure 2C:
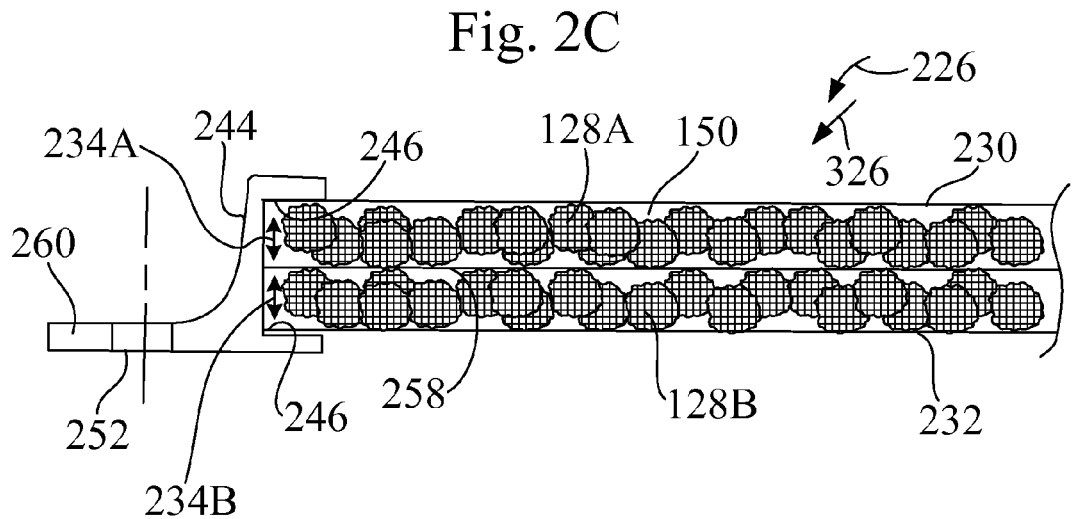
FIG. 2C is a partial sectional side view of another alternate embodiment of the hydrocarbon absorption trap (HCA trap), consistent with the present invention.

FIG. 2C is a partial sectional side view of an alternate embodiment of the hydrocarbon absorption trap (HCA trap) illustrating stacked multiple hydrocarbon adsorption layers. In certain embodiments the HCA trap of FIG. 2C may be similarly represented in a top view as depicted in FIG. 2A. In FIG. 3C the mounting member 244 comprising polyurethane or plastisol is molded onto the periphery of the HCA trap 226 and sealably closing out the edges 246 of the hydrocarbon vapor permeable layers 230 and 232. In some aspects of the invention, the mounting member 244 includes through holes 252 for securing the HCA trap into the air intake tract. In other aspects of the invention the mounting member may be secured to an interior wall of the air cleaner 102 or into a suitable location of the air intake tract 100 by application of an adhesive to portions of the mounting lip 260 of the mounting member 244 to adhesively bond the HCA trap 226 to an interior wall of the air cleaner 102 or air intake tract 100.

In at least one aspect of the invention, hydrocarbon vapor absorptive media 128 (or 128A, 128B) comprises activated charcoal granules. Activated charcoal has been found to be a suitable hydrocarbon vapor absorbing material due to its very large surface area to weight ratio together with its porous internal structure while also being readily available, environmentally friendly and relatively low in cost.

In other aspects of the invention the hydrocarbon vapor absorptive media may comprise zeolite or alternately other absorbent materials having a structure of micro pores of suitable size to liquefy, absorb and thereby trap hydrocarbon vapors.

In some aspects of the invention, hydrocarbon vapor absorptive media (128, 128A, 128B), for example activated carbon granules, are at least weakly bonded together by the addition of a small amount of adhesive 150 to cohesively bond the activated carbon into a preferred sheet-like shape. The adhesive bonding agent helps to stabilize the form of the vapor absorptive media 128 so as to maintain a preferred relatively uniform distribution of the granules throughout the gap 134. This is advantageous not only to maintain the preferred thin sheet-like shape of the HCA trap 126, but also to maximize the exposed surface area of the hydrocarbon vapor absorptive media 128 over the hydrocarbon vapor permeable layer surface thereby optimizing removal of hydrocarbon vapors by maximizing available hydrocarbon adsorptive media surface area.

In some aspects of the invention, one or more cut-outs or holes 154 may optionally be provided extending through the hydrocarbon adsorptive media (128, 128A, 128B) and the bounding layers (130, 132, 230, 232) (for example as illustrated in FIG. 2B). The optional cut-outs or holes may be provided to provide additional mounting locations for securing the HCA trap, or to allow the HCA trap to be received around other air cleaner structural features or members that may otherwise interfere with installation of the HCA trap. The annular barrier 156 is provided to circumscribe the periphery of the cut-out or hole 154 to maintain sealed containment of the hydrocarbon adsorptive media (128, 128A, 128B) in the HCA trap. In some embodiments the annular barrier 156 may be realized by injection molding of polyurethane around the periphery of the cut-out 154. In other embodiments, the annular barrier 156 may be realized by providing rings of polyester material ultrasonically welded respectfully to the layers (130, 132, 230, 232) so as to circumscribe or surround the cutout(s) 154 (as illustrated in FIG. 2B).

As illustrated in FIG. 2C, in some aspects of the invention the HCA trap may be assembled with multiple hydrocarbon adsorptive media layers, for example hydrocarbon adsorptive media layers 128A and 128B stacked together to provide additional hydrocarbon adsorption capacity. At least one supplemental media retention layer 258 may be disposed between and in a spaced parallel relationship to the first and second layers 230 and 232 to supportively divide the gap between the first 230 and second 232 layers into sub gaps 234A and 234B.

Advantageously, the HCA trap is designed to have air flow tangentially adjacent to but not therethrough, therefore air flow in the intake tract 100 is unrestricted by the presence of the HCA trap.

Advantageously, in preferred embodiments the HCA trap has a flexible sheet-like form, is light in weight and easily secured within the air intake tract or air cleaner.

Advantageously, the HCA trap may be configured with through cutouts or holes in the hydrocarbon adsorptive media.

Advantageously, the HCA trap is simple in construction, low in cost with a long life and may be permanently secured within the air cleaner or air intake tract without a need for replacement.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as critical, required, or essential features or elements of any or all the claims. The invention is defined solely by the appended claims including any amendments made during the pendency of this application and all equivalents of those claims as issued.

The invention claimed is:

1. A hydrocarbon adsorption trap for adsorption of evaporated fuel vapors within an air intake tract of an internal combustion engine, comprising:
    a first fuel vapor permeable media retention layer;
    a second media retention layer positioned in a spaced parallel relationship to said first layer forming a gap therebetween,
    wherein at least one of said layers is a woven or non-woven synthetic fiber sheet;
    a hydrocarbon vapor adsorbent media disposed in said gap between said first and second layers for adsorbing evaporated fuel vapors from said intake tract when said engine is not operating,
    wherein said first and second layers and said adsorbent media form a flexible sheet-like hydrocarbon adsorption trap; and
    a mounting member secured onto and overlaying peripheral edge portions of said first and second layer and projecting outwards beyond said first and second layers,
    said mounting member sealing said gap at said layer edge portions, operatively closing edges of said gap, retaining said adsorbent media between said layers;
    wherein said mounting member circumferentially extends along, secures and closes over at least one of said edge portions of said layers,
    wherein said mounting member includes a mounting lip arranged on opposing sides of said trap, said mounting lip arranged outwardly beyond said first and second layers, said mounting lip having at least one throughhole extending therethrough,
    wherein said mounting lip having said at least one throughhole is configured and adapted for mounting said adsorption trap within said air intake tract.

2. The hydrocarbon adsorption trap of claim 1 wherein said mounting member comprises a material selected from the group consisting of plastisol, polyurethane or polyester blend.

3. The hydrocarbon adsorption trap of claim 2 wherein said trap layers are provided with at least one hole extending therethrough;
    wherein said hydrocarbon vapor adsorbent media is a granular form, said hydrocarbon adsorption trap further comprising:
        an annular barrier circumscribing each of said holes adapted to seal said granules within said trap, preventing their outwards leakage through said holes.

4. The hydrocarbon adsorption trap of claim 2 wherein said adsorbent media includes activated carbon granules.

5. The hydrocarbon adsorption trap of claim 4 wherein said granules are bound together by an adhesive, said adhesive maintaining said granules in a desired spaced distribution between said layers.

6. The hydrocarbon adsorption trap of claim 1, wherein said layers comprise polyester fibers.

7. The hydrocarbon adsorption trap of claim 1, wherein said securing of said mounting member to said layers is provided by any of: injection molding, vibration welding or heat welding.

8. The hydrocarbon adsorption trap of claim 1, wherein said second layer is fuel vapor permeable.

9. The hydrocarbon adsorption trap of claim 8, wherein said hydrocarbon adsorption trap further comprises
  at least one supplemental media retention layer disposed between and in a spaced parallel relationship to said first and second layers, said supplemental media retention layers dividing said gap into sub gaps;
wherein said hydrocarbon vapor adsorbent media is disposed in said sub gaps.

10. The hydrocarbon adsorption trap of claim 1 wherein said adsorption trap is secured within an air cleaner housing.

11. An air cleaner assembly comprising:
an air cleaner housing having an air inlet port, an air outlet port and defining a chamber therein;
a filter element disposed in said chamber and configured to filter air flowing between said inlet and outlet ports;
a hydrocarbon adsorption trap permanently secured to an interior wall of said air cleaner housing, said hydrocarbon adsorption trap comprising:
  a first fuel vapor permeable media retention layer;
  a second media retention layer positioned in a spaced parallel relationship to said first layer forming a gap therebetween,
  wherein at least one of said layers is a woven or non-woven synthetic fiber sheet;
  a hydrocarbon vapor adsorbent media disposed in said gap between said first and second layers for adsorbing evaporated fuel vapors from said intake tract when said engine is not operating; and
  a mounting member secured onto and overlaying peripheral edge portions of said first and second layer and projecting outwards beyond said first and second layers,
  said mounting member closing said gap at said layer edge portions, operatively retaining said adsorbent media between said layers;
wherein said mounting member circumferentially extends along, secures and closes over at least one of said edge portions of said layers,
wherein said mounting member includes a mounting lip arranged on opposing sides of said trap, said mounting lip arranged outwardly beyond said first and second layers, said mounting lip having at least one through-hole extending therethrough,
wherein said mounting lip having said at least one through-hole is configured and adapted for securing said hydrocarbon adsorption trap within said air cleaner.

12. The hydrocarbon adsorption trap of claim 11 wherein said adsorbent media includes activated carbon granules.

13. The hydrocarbon adsorption trap of claim 11, wherein said mounting member circumferentially extends about, secures to and closes over all of said edge portions of said layers.

14. The hydrocarbon adsorption trap of claim 12, further comprising
  at least one supplemental media retention layer disposed between and in a spaced parallel relationship to said first and second layers, said supplemental media retention layers and dividing said gap into sub gaps;
wherein said hydrocarbon vapor adsorbent media is disposed in said sub gaps; and
wherein all media retention layers are fuel vapor permeable.

\* \* \* \* \*